United States Patent
Kim

(10) Patent No.: US 11,861,100 B2
(45) Date of Patent: Jan. 2, 2024

(54) DISPLAY DEVICE

(71) Applicant: LG Display Co., Ltd., Seoul (KR)

(72) Inventor: MinKyu Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/901,752

(22) Filed: Sep. 1, 2022

(65) Prior Publication Data

US 2023/0229255 A1    Jul. 20, 2023

(30) Foreign Application Priority Data

Dec. 30, 2021    (KR) .................. 10-2021-0193483

(51) Int. Cl.
  *G06F 3/041*    (2006.01)
  *G09G 3/00*    (2006.01)
  *H04N 17/00*    (2006.01)
  *G06F 3/044*    (2006.01)

(52) U.S. Cl.
  CPC ........ *G06F 3/04164* (2019.05); *G06F 3/0412* (2013.01); *G09G 3/006* (2013.01); *H04N 17/002* (2013.01); *G06F 3/044* (2013.01); *G06F 2203/04112* (2013.01); *G09G 2330/12* (2013.01)

(58) Field of Classification Search
  CPC .... G06F 3/04164; G06F 3/0412; G06F 3/044; G06F 2203/04112; G09G 3/006; G09G 2330/12; H04N 17/002
  See application file for complete search history.

(56) References Cited

U.S. PATENT DOCUMENTS

| | | |
|---|---|---|
| 11,047,823 B2 | 6/2021 | Lee et al. |
| 2019/0157607 A1* | 5/2019 | Kim ............... H10K 59/122 |
| 2020/0173949 A1 | 6/2020 | Lee et al. |
| 2020/0379595 A1* | 12/2020 | Kim .................. G09G 3/32 |
| 2021/0151516 A1 | 5/2021 | Ding et al. |
| 2021/0325330 A1 | 10/2021 | Lee et al. |
| 2022/0236835 A1* | 7/2022 | Ito .................. G06F 3/0412 |

FOREIGN PATENT DOCUMENTS

KR    10-2020-0066445 A    6/2020

* cited by examiner

*Primary Examiner* — Peter D McLoone
(74) *Attorney, Agent, or Firm* — Fenwick & West LLP

(57) ABSTRACT

A display device includes a plurality of touch electrode disposed in the display area; a touch connection electrode which connects two adjacent touch electrodes which are spaced apart from each other, among the plurality of touch electrodes; and a crack detecting electrode which surrounds the camera area and is disposed on the same layer as the plurality of touch electrodes, the plurality of touch electrodes include a plurality of first touch electrodes extending in a first direction and a plurality of second touch electrodes extending in a second direction intersecting the first direction, wherein the crack detecting electrode includes a first crack detecting electrode which surrounds the camera area and a second crack detecting electrode which is disposed in the display area and extends in the second direction, and the second crack detecting electrode has a zigzag pattern.

11 Claims, 10 Drawing Sheets

DISPLAY DEVICE

CROSS-REFERENCE TO RELATED APPLICATIONS

This application claims the priority of Korean Patent Application No. 10-2021-0193483 filed on Dec. 30, 2021, in the Korean Intellectual Property Office, the disclosure of which is incorporated herein by reference.

BACKGROUND

Field

The present disclosure relates to a light emitting display device, and more particularly, to a display device in which an external visibility of a crack detecting line is minimized.

Description of the Related Art

As the information society develops, demands for display devices which display images is increasing and various types of display devices such as a liquid crystal display device or an organic light emitting display device are utilized.

In order to provide more various functions to users, the display device recognizes a touch on a display panel of a user and may perform input processing based on the recognized touch. For example, a plurality of touch electrodes may be disposed in a display area of a display panel. Further, the display device may sense the touch by sensing change in a capacitance of the touch electrode generated by the touch of the user.

A display area of the display panel in which the touch electrodes are disposed may have various shapes and in some cases, an area where a module such as a camera sensor or a proximity sensor is disposed may be located in the display area. Further, the area where the sensor is disposed may be disposed in the form of a hole in the display area.

As described above, when a hole in which the sensor is disposed is located in the display area, a part of the touch electrode disposed in a peripheral area of the hole or a wiring line for connecting the touch electrode may pass through an area where the hole is disposed. Accordingly, there may be a lot of difficulties to dispose a touch electrode or a wiring line for connecting the touch electrode in a peripheral area of the hole located in the display area.

SUMMARY

An object to be achieved by the present disclosure is to provide a display device in which an external visibility of a crack detecting electrode is improved.

Another object to be achieved by the present disclosure is to provide a display device in which an external visibility of a touch connection electrode is minimized.

Objects of the present disclosure are not limited to the above-mentioned objects, and other objects, which are not mentioned above, can be clearly understood by those skilled in the art from the following descriptions.

In order to achieve the above-described object, according to an aspect of the present disclosure, a display device includes a substrate including a camera area in which a camera is disposed, a display area which surrounds the camera area and includes a plurality of sub pixels, and a non-display area located at the outer periphery of the display area; a plurality of touch electrodes disposed in the display area; a touch connection electrode which connects two adjacent touch electrodes which are spaced apart from each other, among the plurality of touch electrodes; and a crack detecting electrode which surrounds the camera area and is disposed on the same layer as the plurality of touch electrodes, the plurality of touch electrodes include a plurality of first touch electrodes extending in a first direction and a plurality of second touch electrodes extending in a second direction intersecting the first direction, wherein the crack detecting electrode includes a first crack detecting electrode which surrounds the camera area and a second crack detecting electrode which is disposed in the display area and extends in the second direction, and the second crack detecting electrode has a zigzag pattern.

In order to achieve the above-described object, according to another aspect of the present disclosure, a display device includes a substrate including a camera area in which a camera is disposed, a display area which surrounds the camera area and includes a plurality of sub pixels, and a non-display area located at the outer periphery of the display area; an encapsulation unit which covers the display area; a plurality of first touch electrodes and a plurality of second touch electrodes disposed on the encapsulation unit to intersect in different directions; a touch connection electrode which connects two adjacent first touch electrodes among the plurality of first touch electrodes; and a crack detecting electrode which surrounds the camera area and is disposed on the same layer as the plurality of first touch electrodes and the plurality of second touch electrode, the crack detecting electrode includes a first crack detecting electrode which surrounds the camera area and a second crack detecting electrode which is disposed in the display area and extends in the second direction, and the second crack detecting electrode has a zigzag pattern.

Other detailed matters of the exemplary embodiments are included in the detailed description and the drawings.

According to the present disclosure, the external visibility of the crack detecting electrode may be improved by forming an edge of the crack detecting electrode having a mesh pattern so as to correspond to the touch electrode.

According to the present disclosure, the touch connection electrodes are regularly disposed to minimize the external visibility of the crack detecting electrode or the touch connection electrode.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
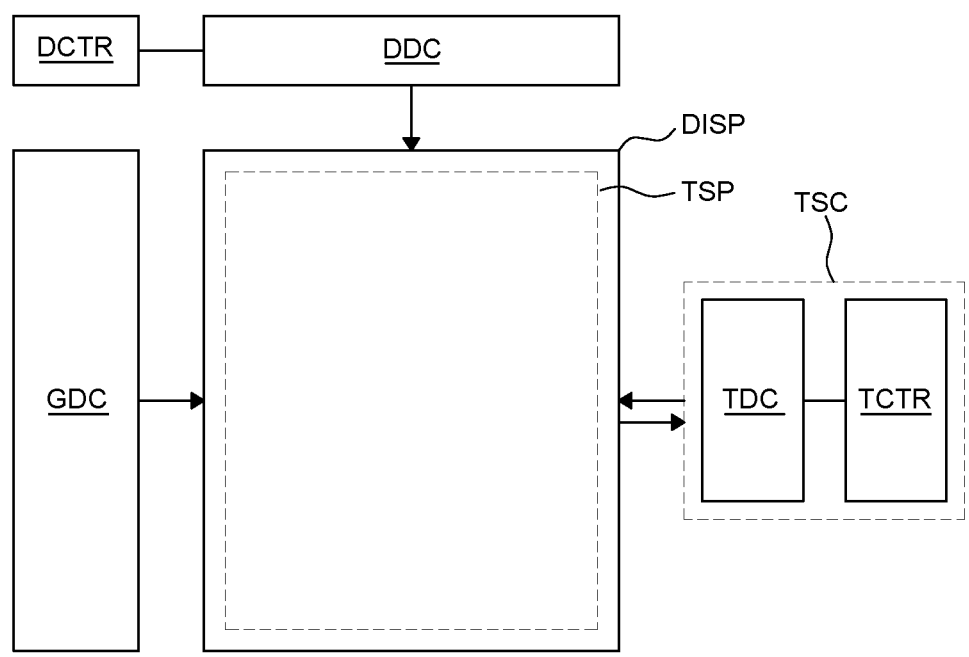
FIG. 1 is a diagram illustrating a schematic configuration of a display device according to an exemplary embodiment of the present disclosure.

The advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person with ordinary skill in the art to which the present disclosure pertains with the category of the present disclosure, and the present disclosure will be defined by the appended claims.

The shapes, dimensions, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since the dimensions and thickness of each component illustrated in the drawings are represented for convenience in explanation, the present disclosure is not necessarily limited to the illustrated dimensions and thickness of each component.

The features of various embodiments of the present disclosure can be partially or entirely coupled to or combined with each other and can be interlocked and operated in technically various ways, and the embodiments can be carried out independently of or in association with each other.

Hereinafter, various exemplary embodiments of the present disclosure will be described in detail with reference to the accompanying drawings.

Figure 2:
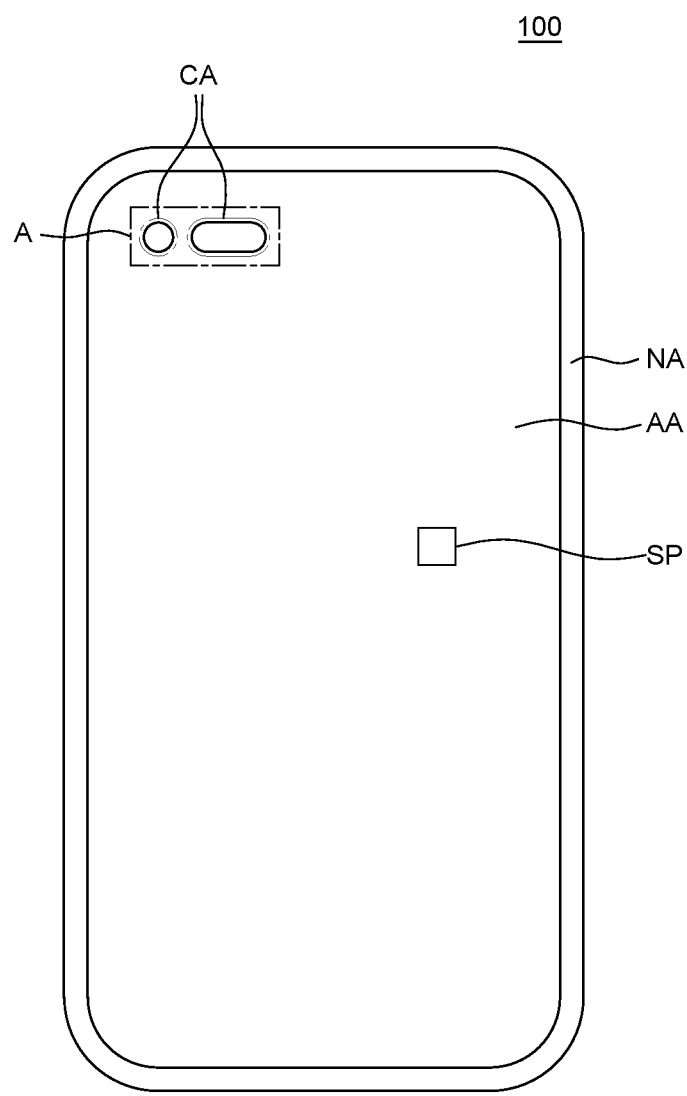
FIG. 2 is a view illustrating a display device according to an exemplary embodiment of the present disclosure.

FIG. 1 is a diagram illustrating a schematic configuration of a display device according to an exemplary embodiment of the present disclosure. FIG. 2 is a view illustrating a display device according to an exemplary embodiment of the present disclosure. FIG. 1 is a system diagram of a display device.

Referring to FIG. 1, a display device includes a display panel DISP in which a plurality of data lines and a plurality of gate lines are disposed and a plurality of sub pixels defined by the plurality of data lines and the plurality of gate lines are disposed, a data driving circuit DDC which drives the plurality of data lines, a gate driving circuit GDC which drives the plurality of gate lines, and a display controller DCTR which controls operations of the data driving circuit DDC and the gate driving circuit GDC.

Each of the data driving circuit DDC, the gate driving circuit GDC, and the display controller DCTR may be implemented by one or more individual components. In some cases, two or more of the data driving circuit DDC, the gate driving circuit GDC, and the display controller DCTR may be implemented to be combined as one component. For example, the data driving circuit DDC and the display controller DCTR may be implemented as one integrated chip (IC chip).

In order to provide a touch sensing function, the display device according to exemplary embodiments of the present disclosure may include a touch panel TSP and a touch sensing circuit TSC. The touch panel TSP includes a plurality of touch electrodes. The touch sensing circuit TSC supplies a touch driving signal to the touch panel TSP and detects a touch sensing signal from the touch panel TSP to sense the presence of a touch of a user or a touch position (touch coordinate) in the touch panel TSP based on the detected touch sensing signal.

For example, the touch sensing circuit TSC may include a touch driving circuit TDC and a touch controller TCTR. The touch driving circuit TDC supplies a touch driving signal to the touch panel TSP and detects a touch sensing signal from the touch panel TSP. The touch controller TCTR senses the presence of a touch of a user and/or a touch position in the touch panel TSP based on the touch sensing signal detected by the touch driving circuit TDC.

The touch driving circuit TDC may include a first circuit part which supplies the touch driving signal to the touch panel TSP and a second circuit part which detects the touch sensing signal from the touch panel TSP.

The touch driving circuit TDC and the touch controller TCTR may be implemented by separate components or in some cases, may be implemented to be combined as one component.

In the meantime, each of the data driving circuit DDC, the gate driving circuit GDC, and the touch driving circuit TDC may be implemented by one or more integrated circuits. From the viewpoint of electrical connection with the display panel DISP, the circuits may be implemented by a chip on glass (COG) type, a chip on film (COF) type, a tape carrier package (TCP) type, or the like. Further, the gate driving circuit GDC may also be implemented by a gate in panel (GIP) type.

In the meantime, each of circuit configurations DDC, GDC, and DCTR for driving the display panel DISP and circuit configurations TDC and TCTR for touch sensing may be implemented by one or more individual components. In some cases, one or more of circuit configurations DDC, GDC, and DCTR for display driving and one or more of circuit configurations TDC and TCTR for touch sensing are functionally integrated to be implemented by one or more components.

For example, the data driving circuit DDC and the touch driving circuit TDC may be implemented to be integrated in one or two or more integrated circuit chips. When the data driving circuit DDC and the touch driving circuit TDC are implemented to be integrated in two or more integrated circuit chips, each of the two or more integrated circuit chips may have a data driving function and a touch driving function.

In the meantime, the display device according to the exemplary embodiments of the present disclosure may be various types such as an organic light emitting display device or a liquid crystal display device. In the following description, for the convenience of description, it will be described that the display device with an integrated touch screen is an organic light emitting display device as an example. That is, even though the display panel DISP may be various types such as an organic light emitting display panel or a liquid crystal display panel, in the following description, for the convenience of description, it will be described that the display panel DISP is an organic light emitting display panel as an example.

The touch panel TSP may include a plurality of touch electrodes which are applied with a touch driving signal or detect a touch sensing signal therefrom and a plurality of touch routing lines which connect the plurality of touch electrodes to the touch driving circuit TDC.

The touch panel TSP may be provided at the outside of the display panel DISP. For example, the touch panel TSP and the display panel DISP may be separately manufactured to be combined. Such a touch panel TSP is called an external type or an add-on type, but is not limited to this terminology.

The touch panel TSP may be embedded in the display panel DISP. For example, when the display panel DISP is manufactured, a touch sensor structure such as a plurality of touch electrodes and a plurality of touch routing lines which configure a touch panel TSP may be formed together with electrodes and signal lines for driving the display device. Such a touch panel TSP is called an embedded type, but is not limited to this terminology. Hereinafter, for the convenience of description, it is assumed that the touch panel TSP is an embedded type, but the touch panel TSP is not limited thereto.

Referring to FIG. 2, the display panel DISP includes a camera area CA in which the plurality of sub pixels SP are not disposed, but a camera is disposed, a display area AA which surrounds the camera area CA and has a plurality of sub pixels SP disposed therein, and a non-display area NA which is disposed in the outer periphery of the display area AA.

In the display area AA, a plurality of sub pixels SP for image displaying is disposed and various electrodes or signal lines for display driving may be disposed.

Further, in the display area AA, a plurality of touch electrodes for touch sensing and a plurality of touch routing lines electrically connected thereto may be disposed. Accordingly, the display area AA may also be referred to as a touch sensing area which is capable of sensing the touch.

In the non-display area NA, no image is displayed and wiring lines and circuit units may be formed. For example, in the non-display area NA, a plurality of pads may be disposed and the pads may be connected to the plurality of sub pixels SP of the display areas AA, respectively.

Further, in the non-display area NA of the display panel DISP, link lines extending from a plurality of touch routing lines disposed in the display area AA or link lines which are electrically connected to a plurality of touch routing lines disposed in the display area AA, and pads which are electrically connected to the link lines may be disposed. The pads disposed in the non-display area NA may be bonded or electrically connected with the touch driving circuit TDC.

In the non-display area NA, a part of an outermost touch electrode among a plurality of touch electrodes disposed in the display area AA expands or one or more electrodes (touch electrodes) formed of the same material as the plurality of touch electrodes disposed in the display area AA may be further disposed.

For example, all the plurality of touch electrodes disposed in the display panel DISP may be disposed in the display area AA or some (for example, an outermost touch electrode) among the plurality of touch electrodes disposed in the display panel DISP may be disposed in the non-display area NA. Some (for example, an outermost touch electrode) among the plurality of touch electrodes disposed in the display panel DISP may be disposed in both the display area AA and the non-display area NA.

Figure 3:
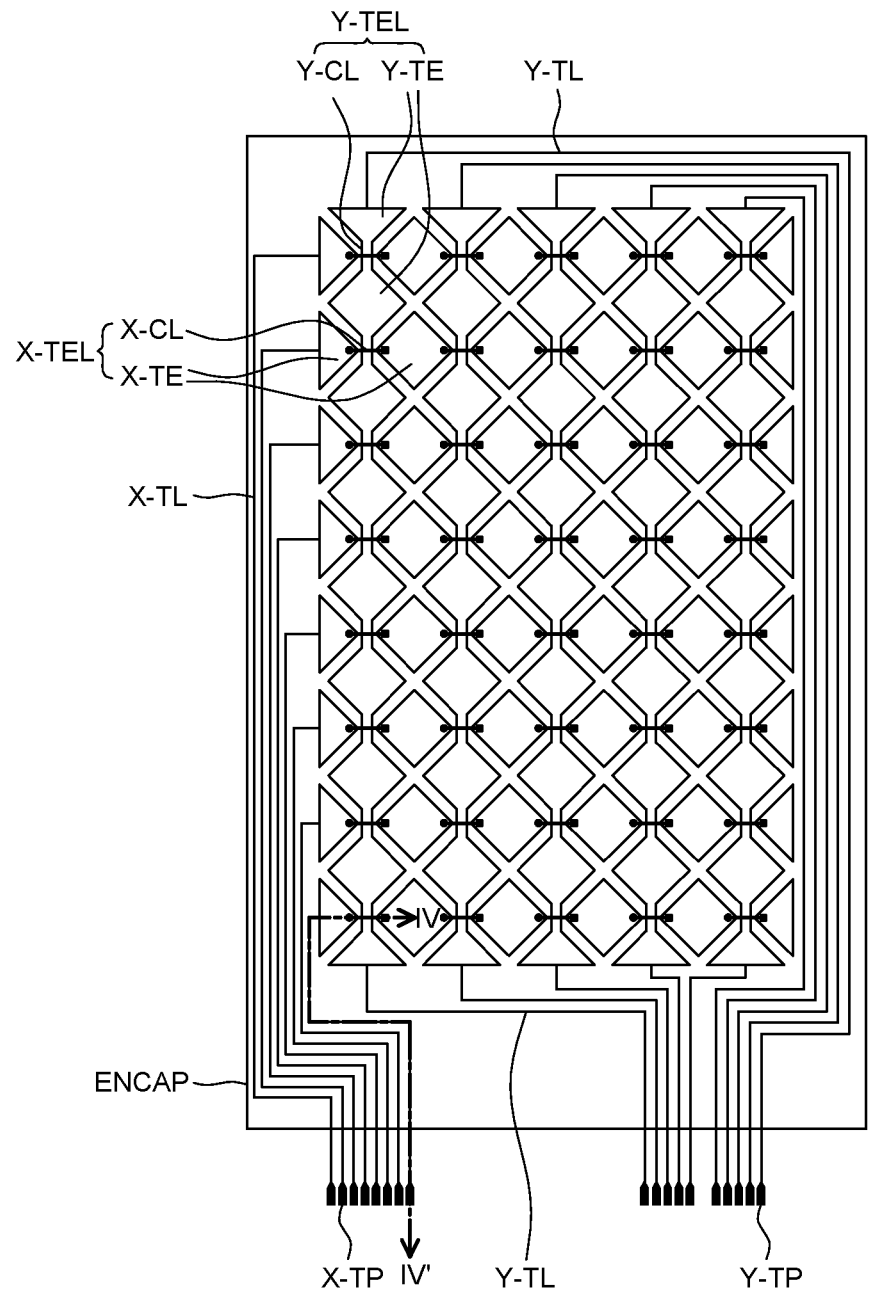
FIG. 3 is an exemplary view of a touch panel in a display device according to an exemplary embodiment of the present disclosure.

FIG. 3 is an exemplary view of a touch panel in a display device according to an exemplary embodiment of the present disclosure. In FIG. 3, for the convenience of description, among various configurations of the display device 100, only an encapsulation unit ENCAP, a touch electrode TE, a routing line TL, and a touch pad TP are illustrated.

On the encapsulation unit ENCAP, a plurality of first touch electrode lines X-TEL and a plurality of second touch electrode lines Y-TEL are disposed. Each of the plurality of first touch electrode lines X-TEL is disposed in a first direction X and each of the plurality of second touch electrode lines Y-TEL may be disposed in a second direction Y intersecting the first direction X.

Each of the plurality of first touch electrode lines X-TEL includes a plurality of first touch electrodes X-TE which are electrically connected, and each of the plurality of second touch electrode lines Y-TEL includes a plurality of second touch electrodes Y-TE which are electrically connected.

The plurality of first touch electrodes X-TE which configure the plurality of first touch electrode lines X-TEL may be driving touch electrodes and the plurality of second touch electrodes Y-TE which configure the plurality of second touch electrode lines Y-TEL may be sensing touch electrodes and vice versa.

The plurality of touch routing lines TL may include at least one first-touch routing line X-TL connected to each of the plurality of first touch electrode lines X-TEL and at least one second touch routing line Y-TL connected to each of the plurality of second touch electrode lines Y-TEL.

Referring to FIG. 3, each of the plurality of first touch electrode lines X-TEL may include a plurality of first touch electrodes X-TE disposed in the same row (or column) and at least one first touch connection electrode X-CL which electrically connects the plurality of first touch electrodes. Each of the plurality of second touch electrode lines Y-TEL may include a plurality of second touch electrodes Y-TE disposed in the same column (or row) and at least one second touch connection electrode Y-CL which electrically connects the plurality of second touch electrodes.

In FIG. 3, the first touch connection electrode X-CL which connects adjacent two first touch electrodes X-TE is metal which is connected to two adjacent first touch electrodes X-TE through a contact hole. Further, the second touch connection electrode Y-CL which connects adjacent two second touch electrodes Y-TE is metal which is integrated with two adjacent second touch electrodes Y-TE, but it is not limited thereto.

In a region (a touch electrode line intersecting region) where the first touch electrode line X-TEL and the second touch electrode line Y-TEL intersect, the first touch connection electrode X-CL and the second touch connection electrode Y-CL may intersect. When the first touch connection electrode X-CL and the second touch connection electrode Y-CL intersect in the touch electrode line intersecting region, the first touch connection electrode X-CL and the second touch connection electrode Y-CL need to be located on different layers.

Each of the plurality of first touch electrode lines X-TEL is electrically connected to a corresponding first touch pad X-TP by means of one or more first touch routing lines X-TL. For example, a first touch electrode X-TE which is disposed at the outermost side, among the plurality of first touch electrodes X-TE included in one first touch electrode line X-TEL, is electrically connected to a corresponding first touch pad X-TP by means of the first touch routing line X-TL. Each of the plurality of second touch electrode lines Y-TEL is electrically connected to a corresponding second touch pad Y-TP by means of one or more second touch routing lines Y-TL. For example, a second touch electrode Y-TE which is disposed at the outermost side, among the plurality of second touch electrodes Y-TE included in one second touch electrode line Y-TEL, is electrically connected to a corresponding second touch pad Y-TP by means of the second touch routing line Y-TL.

Each of the plurality of first touch routing lines X-TL which is electrically connected to the plurality of first touch electrode lines X-TEL may extend to a portion where the encapsulation unit ENCAP is not provided while being disposed on the encapsulation unit ENCAP to be electrically connected to the plurality of first touch pads X-TP. Each of the plurality of second touch routing lines Y-TL which is electrically connected to the plurality of second touch electrode lines Y-TEL may extend to a portion where the encapsulation unit ENCAP is not provided while being disposed on the encapsulation unit ENCAP to be electrically connected to the plurality of second touch pads Y-TP. Here, the encapsulation unit ENCAP may be located in the display area AA and in some cases, may extend to the non-display area NA.

Figure 4:
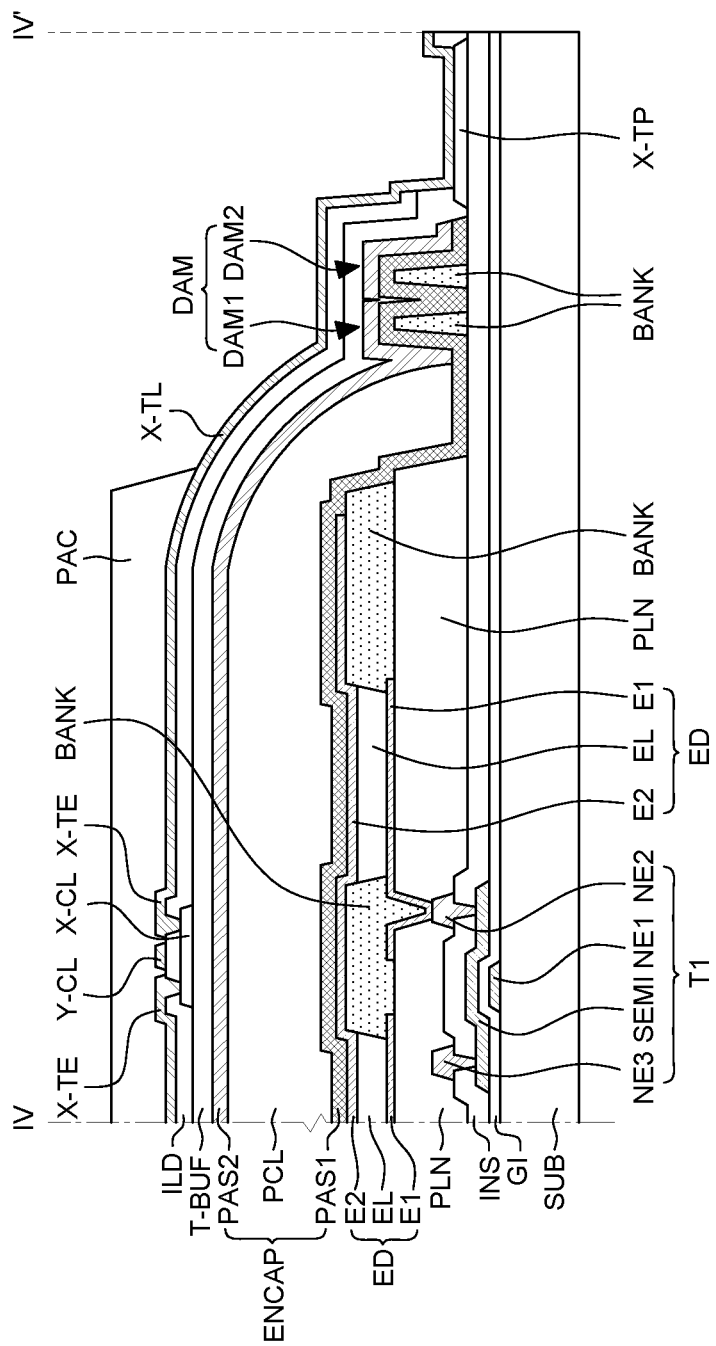
FIG. 4 is a cross-sectional view taken along IV-IV' of FIG. 3.

FIG. 4 is a cross-sectional view taken along IV-IV' of FIG. 3.

Referring to FIG. 4, when the touch panel TSP is embedded in the display panel DISP and the display panel DISP is implemented as an organic light emitting display panel, the touch panel TSP may be located on the encapsulation unit ENCAP in the display panel DISP. In other words, the plurality of touch electrodes TE may be located on the encapsulation layer ENCAP in the display panel DISP.

The first transistor T1 which is a driving transistor in each sub pixel SP in the display area AA is disposed on the substrate SUB.

The first transistor T1 includes a first node electrode NE1 corresponding to a gate electrode, a second node electrode NE2 corresponding to a source electrode or a drain electrode, a third node electrode NE3 corresponding to a drain electrode or a source electrode, and a semiconductor layer SEMI.

The first node electrode NE1 and the semiconductor layer SEMI may overlap with a gate insulating layer GI therebetween. The second node electrode NE2 is formed on an insulating layer INS to be in contact with one side of the semiconductor layer SEMI and the third node electrode NE3 is formed on the insulating layer INS to be in contact with the other side of the semiconductor layer SEMI.

The light emitting diode ED may include a first electrode E1 corresponding to an anode electrode (or a cathode electrode), an emission layer EL formed on the first electrode E1, and a second electrode E2 corresponding to a cathode electrode (or an anode electrode) formed on the emission layer EL.

The first electrode E1 is electrically connected to the second node electrode NE2 of the first transistor T1 which is exposed through a pixel contact hole which passes through the planarization layer PLN.

The emission layer EL is formed on the first electrode EL of the emission area provided by the bank BANK. The emission layer EL may be formed by laminating a hole related layer, an emission layer, and an electron related layer on the first electrode EL in this order or in a reverse order. The second electrode E2 is disposed to be opposite to the first electrode E1 with the emission layer EL therebetween.

The encapsulation unit ENCAP blocks moisture or oxygen from the outside from permeating into the light emitting diode ED which is vulnerable to the moisture or oxygen from the outside.

Figure 9:
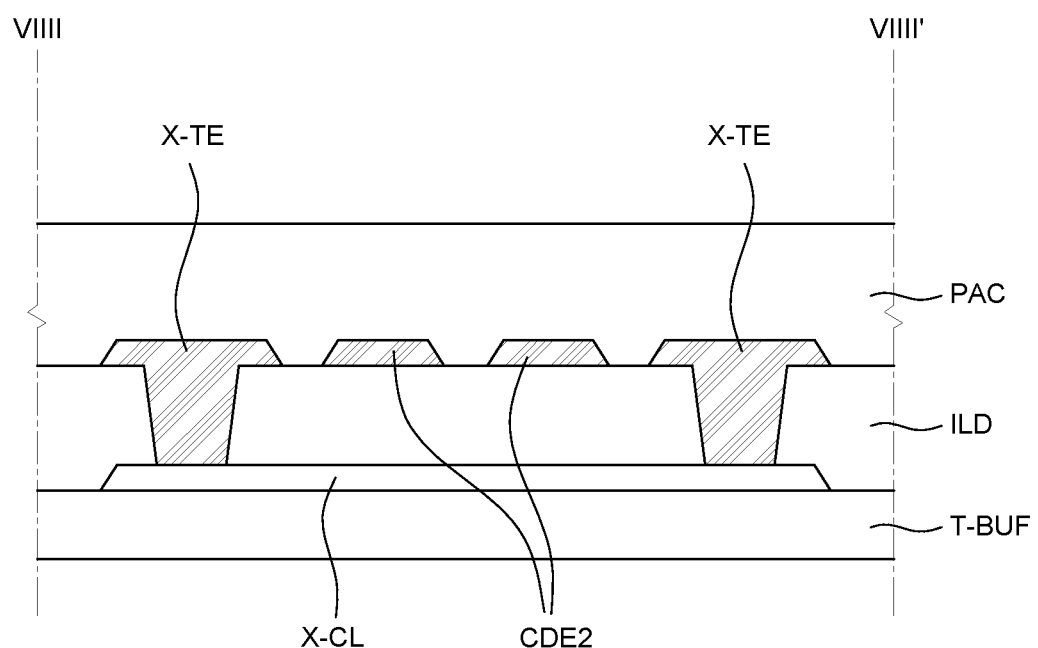
FIG. 9 is a cross-sectional view taken along the line VIIII-VIIII' of FIG. 5.

Such an encapsulation unit ENCAP may be formed as one layer or as illustrated in FIG. 9, may be formed by a plurality of layers PAS1, PCL, and PAS2.

For example, when the encapsulation unit ENCAP is formed of a plurality of layers PAS1, PCL, and PAS2, the encapsulation unit ENCAP may include one or more inorganic encapsulation layers PAS1 and PAS2 and one or more organic encapsulation layer PCL. As a specific example, the encapsulation unit ENCAP may have a structure in which a first inorganic encapsulation layer PAS1, an organic encapsulation layer PCL, and a second inorganic encapsulation layer PAS2 are sequentially laminated.

Here, the organic encapsulation layer PCL may further include at least one organic encapsulation layer or at least one inorganic encapsulation layer.

The first inorganic encapsulation layer PAS1 is formed on the substrate SUB on which the second electrode E2 corresponding to the cathode electrode is formed so as to be most adjacent to the light emitting diode ED. The first inorganic encapsulation layer PAS1 is formed of an inorganic insulating material on which low-temperature deposition is allowed, such as silicon nitride SiNx, silicon oxide SiOx, silicon oxynitride SiON, or aluminum oxide Al2O3, but it is not limited thereto. Since the first inorganic encapsulation layer PAS1 is deposited in a low temperature atmosphere, the first inorganic encapsulation layer PAS1 may suppress the damage of the emission layer EL including an organic material which is vulnerable to a high temperature atmosphere during a deposition process.

The organic encapsulation layer PCL may be formed to have a smaller area than the first inorganic encapsulation layer PAS1 and in this case, the organic encapsulation layer PCL may be formed to expose both ends of the first inorganic encapsulation layer PAS1. The organic encapsulation layer PCL may serve as a buffer which relieves a stress between layers due to the bending of the display device with an integrated touch screen which is an organic light emitting display device and also serve to enhance a planarization performance. The organic encapsulation layer PCL may be formed of an organic insulating material, such as acrylic resin, epoxy resin, polyimide, polyethylene, or silicon oxy carbon (SiOC).

The organic encapsulation layer PCL may be formed by an inkjet method. When the organic encapsulation layer PCL is formed by the inkjet method, at least one dam DAM may be formed in a boundary area of the non-display area NA and the display area AA or in a partial area in the non-display area NA.

For example, as illustrated in FIG. 4, a first primary dam DAM1 which is located between a pad area in which the plurality of first touch pads X-TP and the plurality of second touch pads Y-TP in the non-display area and the display area AA and is adjacent to the display area AA and a secondary dam DAM2 adjacent to the pad area may be disposed.

One or more dams DAM may suppress the liquid type organic encapsulation layer PCL from flowing to the non-display area NA to invade the pad area until a liquid type organic encapsulation layer PCL is dropped in the display area AA and then hardened.

The primary dam DAM1 and/or the secondary dam DAM2 may be formed with a single layer or multi-layered structure. For example, the primary dam DAM1 and/or the secondary dam DAM2 may be formed simultaneously with the same material as at least one of the bank BANK and the spacer (not illustrated). In this case, the dam structure may be formed without having the mask adding process and increasing the cost.

Further, the primary dam DAM1 and/or the secondary dam DAM2 may be formed with a structure in which a first inorganic encapsulation layer PAS1 and/or a second inorganic encapsulation layer PAS2 are laminated on the bank BANK.

Figure 5:
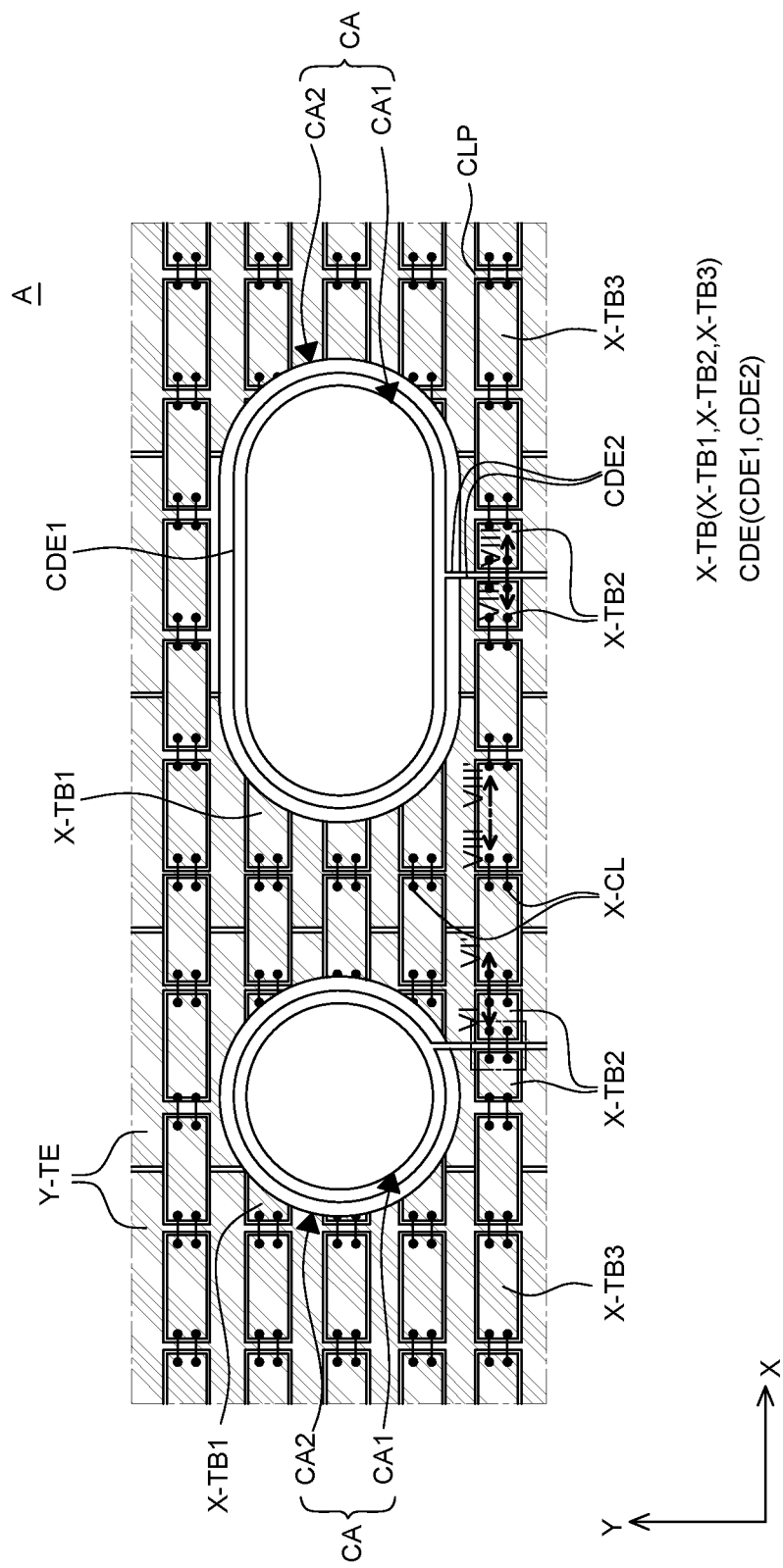
FIG. 5 is an enlarged view of an area A of FIG. 2.

Further, the organic encapsulation layer PCL including an organic material, as illustrated in FIG. 5, may be located only on an inner surface of the primary dam DAM1.

In contrast, the organic encapsulation layer PCL including an organic material may also be located above at least a part of the primary dam DAM1 and the secondary dam DAM2. For example, the organic encapsulation layer PCL may be located above the primary dam DAM1.

The second inorganic encapsulation layer PAS2 may be formed on the substrate SUB on which the organic encapsulation layer PCL is formed so as to cover an upper surface and a side surface of the organic encapsulation layer PCL and the first inorganic encapsulation layer PAS1. The second inorganic encapsulation layer PAS2 may minimize or block the permeation of the external moisture or oxygen into the first inorganic encapsulation layer PAS1 and the organic encapsulation layer PCL. The second inorganic encapsulation layer PAS2 is formed of an inorganic insulating material, such as silicon nitride SiNx, silicon oxide SiOx, silicon oxynitride SiON, or aluminum oxide Al2O3, but it is not limited thereto.

A touch buffer layer T-BUF may be disposed on the encapsulation unit ENCAP. The touch buffer layer T-BUF may be located between a touch sensor metal including second touch electrodes X-TE and Y-TE and second touch connection electrodes X-CL and Y-CL and the second electrode E2 of the light emitting diode ED.

The touch buffer layer T-BUF may be designed to maintain a distance between the touch sensor metal and the second electrode E2 of the light emitting diode ED to a predetermined minimum distance (for example, 1 m). Accordingly, the touch buffer layer T-BUF may reduce or suppress parasitic capacitance formed between the touch sensor metal and the second electrode E2 of the light emitting diode ED to suppress the touch sensitivity degradation due to the parasitic capacitance.

The touch sensor metal including the plurality of touch electrodes X-TE and Y-TE and the plurality of touch connection electrodes X-CL and Y-CL may be disposed on the encapsulation unit ENCAP without providing the touch buffer layer T-BUF.

Further, the touch buffer layer T-BUF may suppress the permeation of a chemical solution (a developer or an etchant) used for a manufacturing process of a touch sensor metal disposed on the touch buffer layer T-BUF or moisture from the outside into the emission layer EL including an organic material. By doing this, the touch buffer layer T-BUF may suppress the damage of the emission layer EL which is vulnerable to chemical solutions or moisture.

The touch buffer layer T-BUF may be formed of an organic insulating material which is formed at a temperature lower than a predetermined temperature (for example, 100° C.) to suppress the damage of the emission layer EL including an organic material which is vulnerable to a high temperature. The organic insulating material has a low permittivity of 1 to 3. For example, the touch buffer layer T-BUF may be formed of acrylic, epoxy, or siloxane based material, but it is not limited thereto. The touch buffer layer T-BUF which is formed of an organic insulating material and has a planarization performance may suppress the damage of the encapsulation layers PAS1, PCL, and PAS2 which configure the encapsulation unit ENCAP in accordance with the bending of the organic light emitting display device. Further, the touch buffer layer T-BUF may suppress the crack of the touch sensor metal formed on the touch buffer layer T-BUF.

According to a mutual-capacitance based touch sensor structure, the first touch electrode line X-TEL and the second touch electrode line Y-TEL are disposed on the touch buffer layer T-BUF and the first touch electrode line X-TEL and the second touch electrode line Y-TEL may be disposed to intersect each other.

The second touch electrode line Y-TEL may include a plurality of second touch electrodes Y-TE and a plurality of second touch connection electrodes Y-CL which electrically connect the plurality of second touch electrodes Y-TE.

Referring to FIGS. 3 and 4 together, the plurality of second touch electrodes Y-TE may be spaced apart from each other with a regular interval along the second direction Y. Each of the plurality of second touch electrodes Y-TE may be electrically connected to another second touch electrode Y-TE adjacent thereto in the second direction Y through the second touch connection electrode Y-CL.

The second touch connection electrode Y-CL is disposed on the same plane as the second touch electrode Y-TE to be electrically connected to two second touch electrodes Y-TE adjacent in the second direction Y without a separate contact hole or integrated with two second touch electrodes Y-TE adjacent in the second direction Y.

The second touch connection electrode Y-CL may be disposed so as to overlap the bank BANK. Accordingly, the degradation of an aperture rate due to the second touch connection electrode Y-CL may be suppressed.

The touch electrode line X-TEL may include a plurality of first touch electrodes X-TE and a plurality of first touch connection electrodes X-CL which electrically connect between the plurality of first touch electrodes X-TE.

The plurality of first touch electrodes X-TE may be spaced apart from each other along a first direction X with a regular interval on the touch insulating layer ILD. Each of the plurality of first touch electrodes X-TE may be electrically connected to another first touch electrode X-TE adjacent thereto in the first direction X through the first touch connection electrode X-CL.

Referring to FIG. 4, the plurality of first touch electrodes X-TE and the plurality of first touch connection electrodes X-CL may be located on different layers with the touch insulating layer ILD therebetween. The first touch connection electrode X-CL is formed on the touch buffer layer T-BUF and is exposed through a touch contact hole which passes through the touch insulating layer ILD to be electrically connected to two first touch electrodes X-TE adjacent in the first direction X.

The first touch connection electrode X-CL may be disposed so as to overlap the bank BANK. Accordingly, the degradation of an aperture rate due to the first touch connection electrode X-CL may be suppressed.

In the meantime, the second touch electrode line Y-TEL may be electrically connected to the touch driving circuit TDC by means of the second touch routing line Y-TL and the second touch pad Y-TP. Similarly, the first touch electrode line X-TEL may be electrically connected to the touch driving circuit TDC by means of the first touch routing line X-TL and the first touch pad X-TP.

A pad cover electrode which covers the first touch pad X-TP and the second touch pad Y-TP may be further disposed.

The first touch pad X-TP may be separately formed from the first touch routing line X-TL or may be formed by extending the first touch routing line X-TL. The second touch pad Y-TP may be separately formed from the second touch routing line Y-TL or may be formed by extending the second touch routing line Y-TL.

When the first touch pad X-TP is formed by extending the first touch routing line X-TL and the second touch pad Y-TP is formed by extending the second touch routing line Y-TL, the first touch pad X-TP, the first touch routing line X-TL, the second touch pad Y-TP, and the second touch routing line Y-TL may have the same first conductive material. Here, for example, the first conductive material may be formed to have a single layer or a multi-layered structure using a metal having high corrosion resistance, acid resistance, and good conductivity such as aluminum (Al), titanium (Ti), copper (Cu), or molybdenum (Mo), but is not limited thereto.

For example, the first touch pad X-TP, the first touch routing line X-TL, the second touch pad Y-TP, and the second touch routing line Y-TL which are formed of the first conductive material may be formed with a triple-layered structure such as titanium (Ti)/aluminum (Al)/titanium (Ti) or molybdenum (Mo)/aluminum (Al)/molybdenum (Mo), but are not limited thereto.

The pad cover electrode which covers the first touch pad X-TP and the second touch pad Y-TP may be configured with a second conductive material which is the same material as the first and second touch electrodes X-TE and Y-TE. Here, the second conductive material may be formed of a transparent conductive material having a strong corrosion resistance and acid resistance such as indium tin oxide (ITO) or indium zinc oxide (IZO). Such a pad cover electrode is formed to be exposed by the touch buffer layer T-BUF to be bonded with the touch driving circuit TDC or bonded with a circuit film in which the touch driving circuit TDC is mounted.

The touch buffer layer T-BUF is formed to cover the touch sensor metal to suppress the corrosion of the touch sensor metal due to the moisture from the outside. For example, the touch buffer layer T-BUF may be formed of an organic insulating material or formed in the form of a circular polarizer or an epoxy or acrylic film. Such a touch buffer layer T-BUF may not be provided on the encapsulation unit ENCAP. For example, the touch buffer layer T-BUF may be omitted depending on the structure of the display device.

The second touch routing line Y-TL may be electrically connected to the second touch electrode Y-TE through a touch routing line contact hole or may be integrally formed with the second touch electrode Y-TE.

Such a second touch routing line Y-TL extends to the non-display area NA and passes through an upper portion and a side surface of the encapsulation unit ENCAP and an upper portion and a side surface of the dam DAM to be electrically connected to the second touch pad Y-TP. Accordingly, the second touch routing line Y-TL may be electrically connected to the touch driving circuit TDC by means of the second touch pad Y-TP.

The second touch routing line Y-TL may transmit a touch sensing signal from the second touch electrode Y-TE to the touch driving circuit TDC or may be supplied with the touch driving signal from the touch driving circuit TDC to transmit the touch driving signal to the second touch electrode Y-TE.

The first touch routing line X-TL may be electrically connected to the first touch electrode X-TE through a touch routing line contact hole or may be integrally formed with the first touch electrode X-TE.

The first touch routing line X-TL extends to the non-display area NA and passes through an upper portion and a side surface of the encapsulation unit ENCAP and an upper portion and a side surface of the dam DAM to be electrically connected to the first touch pad X-TP. Accordingly, the first touch routing line X-TL may be electrically connected to the touch driving circuit TDC by means of the first touch pad X-TP.

The first touch routing line X-TL may be supplied with the touch driving signal from the touch driving circuit TDC to transmit the touch driving signal to the first touch electrode X-TE or may transmit a touch sensing signal from the first touch electrode X-TE to the touch driving circuit TDC.

The placement of the first touch routing line X-TL and the second touch routing line Y-TL may be changed in various manners depending on a panel design specification.

A touch protection layer PAC may be disposed on the first touch electrode X-TE and the second touch electrode Y-TE. The touch protection layer PAC extends before or after the dam DAM to be disposed also on the first touch routing line X-TL and the second touch routing line Y-TL.

Figure 6:
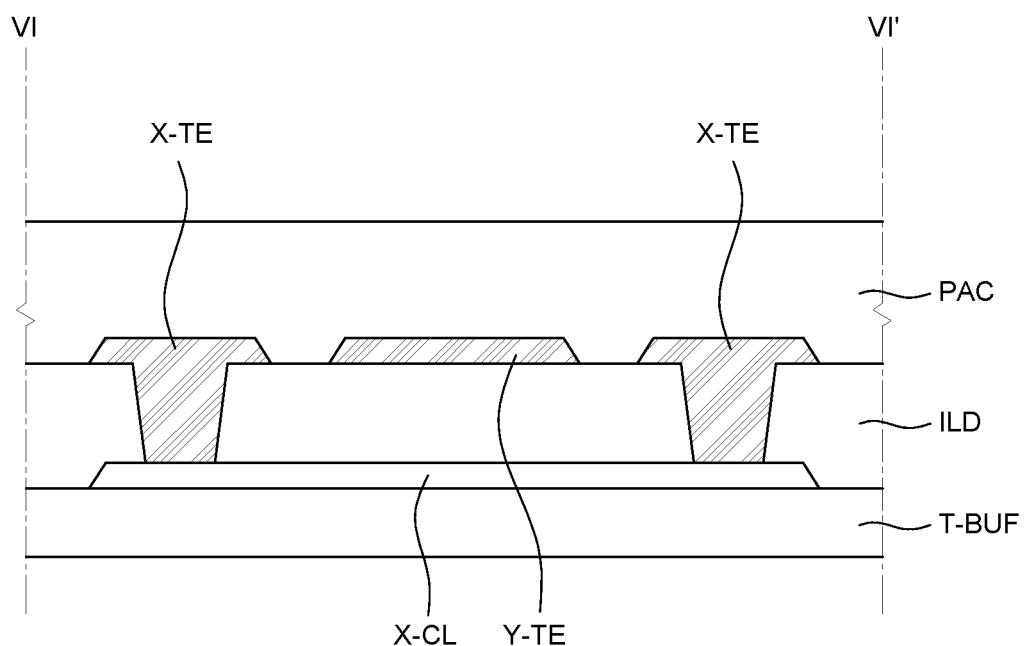
FIG. 6 is a cross-sectional view taken along the line VI-VI' of FIG. 5.
Figure 7:
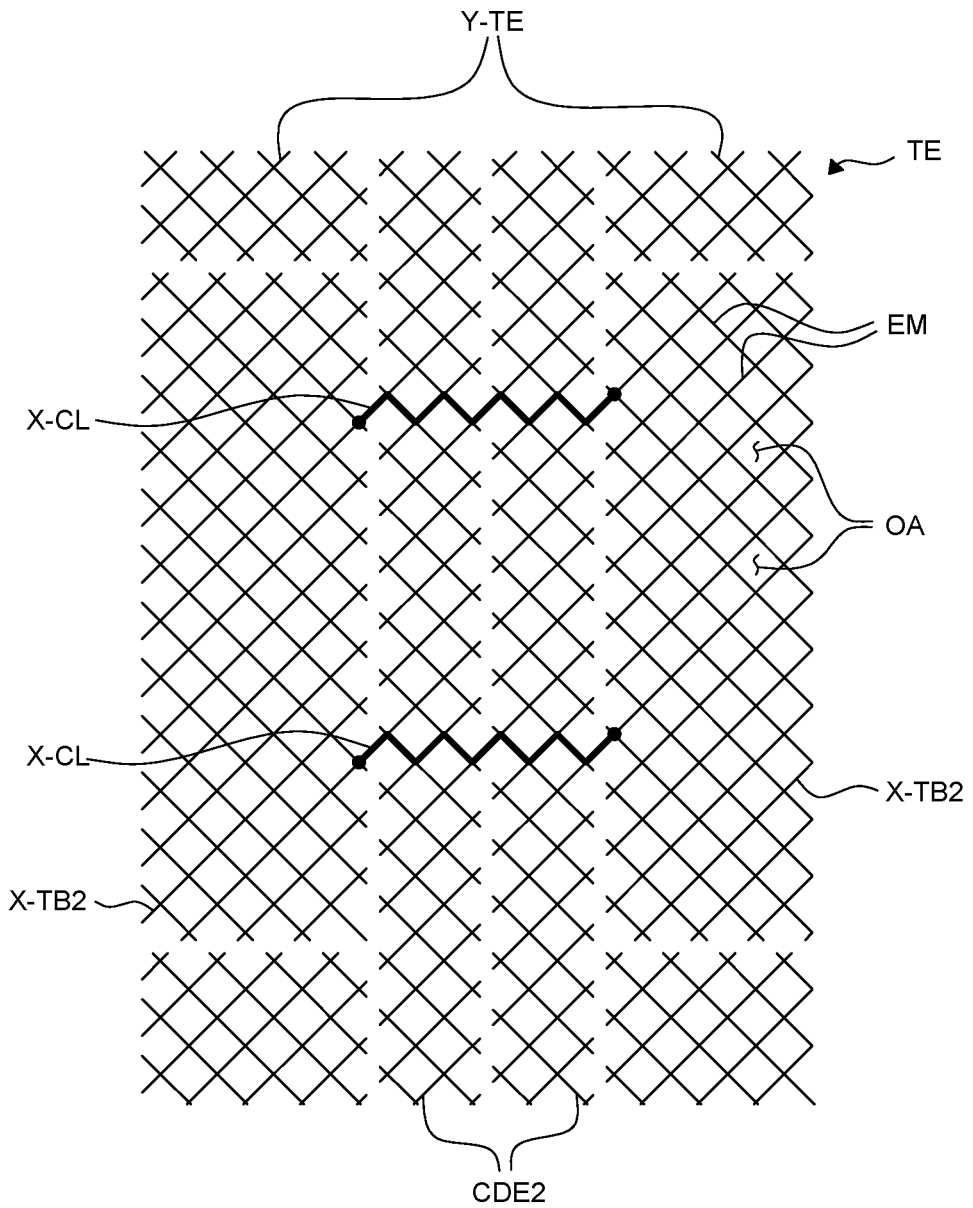
FIG. 7 is an enlarged view of an area B of FIG. 5.
Figure 8:
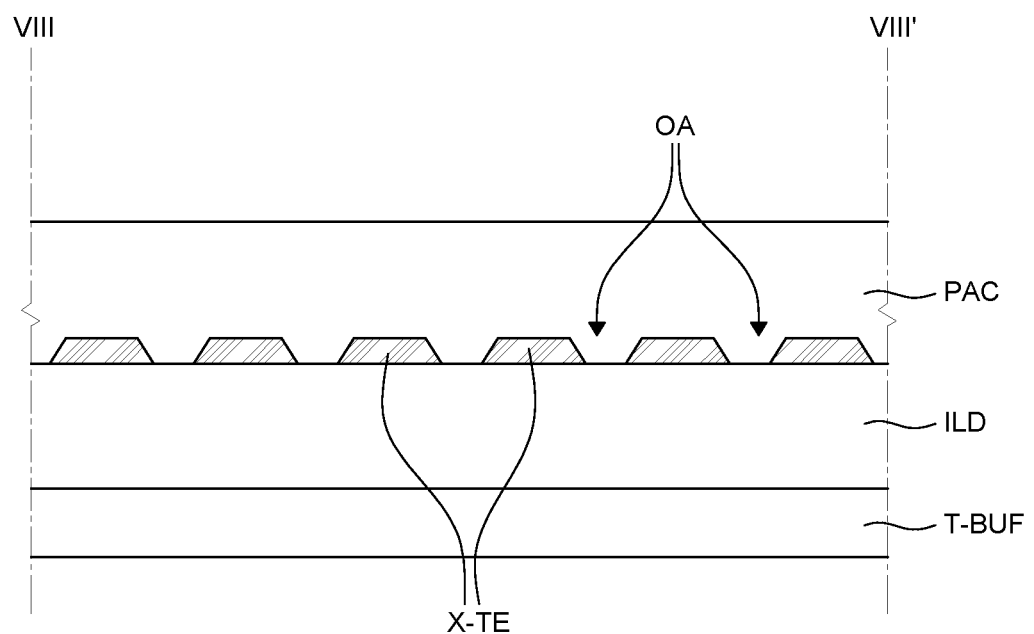
FIG. 8 is a cross-sectional view taken along the line VIII-VIII' of FIG. 5.

FIG. 5 is an enlarged view of an area A of FIG. 2. FIG. 6 is a cross-sectional view taken along the line VI-VI' of FIG. 5. FIG. 7 is an enlarged view of an area B of FIG. 5. FIG. 8 is a cross-sectional view taken along the line VIII-VIII' of FIG. 5. FIG. 9 is a cross-sectional view taken along the line VIIII-VIIII' of FIG. 5. FIG. 5 is a view schematically illustrating a touch electrode TE.

Referring to FIG. 5, the display area AA includes a camera area CA. The camera area CA may include an opening area CA1 which passes through the substrate SUB and a boundary area CA2 in the outer periphery of the opening area OA, for example, between the display area AA and the opening area CA1. The encapsulation unit ENCAP may cover the display area AA and the boundary area CA2 and a plurality of first touch electrodes X-TE extending in a first direction X and a plurality of second touch electrodes Y-TE extending in a second direction Y may be disposed on the encapsulation unit ENCAP.

The plurality of first touch electrodes X-TE include a plurality of touch blocks X-TB. For example, the plurality of first touch electrodes X-TE are gathered to form one block unit. Each of the plurality of touch blocks X-TB may be spaced apart from each other on the same plane. At this time, an area between the plurality of touch blocks X-TB is an area in which a plurality of first touch connection electrodes X-CL are and is referred to as a connection unit CLP.

Even though in FIG. 5, it is illustrated in two first touch connection electrodes X-CL which electrically connect two different touch blocks X-TB adjacent to each other in the first direction X are disposed in each connection unit CLP, the number of first touch connection electrodes X-CL is not limited thereto.

Referring to FIG. 6, the first touch connection electrodes X-CL is not disposed on the same plane as the plurality of touch blocks X-TB and electrically connects two first touch electrodes X-TE adjacent to each other through a contact hole with a touch insulating layer ILD therebetween. The first touch connection electrode X-CL may be disposed below the plurality of touch electrodes TE, but may also be disposed above the plurality of touch electrodes.

Referring back to FIG. 5, the plurality of second touch electrodes Y-TE are disposed in a remaining area excluding an area in which the plurality of touch blocks X-TB are disposed and the camera area CA. The plurality of second touch electrodes Y-TE adjacent to the camera area CA, among the plurality of second touch electrodes Y-TE, may correspond to a rounded shape of the camera area CA.

The second touch connection electrode Y-CL is disposed on the same plane as the second touch electrode Y-TE to be electrically connected to two second touch electrodes Y-TE adjacent in the second direction Y without a separate contact hole or integrated with two second touch electrodes Y-TE adjacent in the second direction Y.

Referring to FIGS. 5 and 6 together, the second touch connection electrode Y-CL extending in the second direction Y may be disposed in an area overlapping the first touch connection electrode X-CL extending in the first direction X. For example, the first touch connection electrode X-CL and the second touch connection electrode Y-CL are not disposed on the same layer, but may be insulated from each other with the touch insulating layer ILD therebetween.

A crack detecting electrode CDE may be disposed in the boundary area CA2 between the opening area CA1 and the touch block X-TB. The crack detecting electrode CDE may be disposed on the same layer as the plurality of touch electrodes TE. The crack detecting electrode CDE is insulated from the plurality of touch electrodes TE and at least some may be disposed on the same layer as the plurality of touch electrodes TE.

The crack detecting electrode CDE is disposed between an outer periphery of the opening area CA1 and an area in which the touch electrode TE is disposed to detect a crack which may be caused during a process of forming the opening area CA1.

The crack detecting electrode CDE may include a first crack detecting electrode CDE1 enclosing the camera area CA and a second crack detecting electrode CDE2 which is disposed in the display area AA and extends in the second direction Y. The first crack detecting electrode CDE1 and the second crack detecting electrode CDE2 are disposed on the same plane to be electrically connected to each other. Even though not illustrated in the drawing, the second crack detecting electrode CDE2 is connected to a third crack detecting electrode to be connected to a pad disposed in an edge of the display panel DISP opposite to an edge of the display panel DISP adjacent to the camera area CA. The third crack detecting electrode may be disposed in the display area AA and the non-display area NA so as to enclose the display area AA disposed inside from the camera area CA.

When the crack is generated in the boundary area CA2, the first crack detecting electrode CDE1 or the second crack detecting electrode CDE2 are shorted to detect the crack of the boundary area CA2.

The plurality of touch blocks TB may be divided into a first touch block X-TB1 adjacent to the camera area CA, a second touch block X-TB2 adjacent to the second crack detecting electrode CDE2, and a third touch block X-TB3 which is a remaining touch block excluding the first touch block X-TB1 and the second touch block X-TB2.

The first touch block X-TB1 is disposed to be adjacent to the camera area CA so that a part of the first touch block X-TB1 corresponds to a round shape of the camera area CA. For example, the first touch block X-TB1 may have a shape obtained when a part of the third touch block X-TB3 is cut by the camera area CA.

The third touch block X-TB3 refers to a touch block which has a different size from that of the first touch block X-TB1 and is disposed so as not to be adjacent to the camera area CA and the second crack detecting electrode CDE2. For example, the plurality of touch blocks TB disposed in a display area AA located inside from a display area AA adjacent to the camera area CA may be the third touch block X-TB3.

The second touch block X-TB2 has a size different from the third touch block X-TB3. The second crack detecting electrode CDE2 is disposed on the same plane as the second touch block X-TB2 to be disposed between two adjacent second touch blocks X-TB2 and intersect the first touch connection electrode X-CL. However, the second crack detecting electrode CDE2 is not electrically connected to any of the touch block TB or the touch connection electrode CL. In other words, the second crack detecting electrode CDE2 is disposed to intersect between at least one third touch block X-TB3 so that one third touch block X-TB3 may be changed to two second touch blocks X-TB2 and the second crack detecting electrode CDE2 is disposed between the second touch blocks X-TB2. The first touch connection electrode X-CL which electrically connects between the third touch blocks X-TB3 may be additionally disposed between the second touch blocks X-TB2 to electrically connect the second touch blocks X-TB2 disposed on both ends of the second crack detecting electrodes CDE2.

Referring to FIGS. 7 and 8, the plurality of first touch electrodes X-TE are formed with a mesh pattern. For example, the first touch electrode X-TE may be an electrode metal EM which is patterned to have a mesh type to have two or more openings OA between two adjacent first touch electrodes X-TE.

Each of two or more openings OA in each touch electrode TE may correspond to an emission area of one or more sub pixels SP. For example, the plurality of openings OA may serve as a path on which light emitted from the plurality of sub pixels SP disposed therebelow passes.

In order to form a plurality of touch electrodes TE, the electrode metal ME is broadly formed to be a mesh type and then the electrode metal EM is cut to have a predetermined pattern to electrically separate the electrode metals EM. Consequently, a plurality of touch electrodes TE may be created.

For example, the plurality of touch blocks TB may be formed by cutting an outer periphery of a pattern corresponding to a touch block shape which is the plurality of first touch electrodes X-TE. Even though in FIG. 5, the touch block TB is illustrated as a quadrangular shape, various shapes such as a rhombus, a diamond, a triangle, and a pentagon are possible.

Referring to FIG. 7, the plurality of second touch electrodes Y-TE is formed with a mesh pattern. For example, each second touch electrode may be an electrode metal EM which is patterned to have a mesh type to have two or more openings OA between adjacent second touch electrodes Y-TE. Further, the plurality of second touch electrodes Y-TE are not connected to the plurality of touch blocks TB which are the plurality of first touch electrodes X-TE so that the edge of the plurality of second electrodes Y-TE adjacent to the plurality of touch blocks TB may be cut. Accordingly, the opening is also formed between the plurality of second touch electrodes Y-TE and the plurality of first touch electrodes X-TE.

Referring to FIGS. 7 and 9 together, the second crack detecting electrode CDE2 has a zigzag pattern. The second crack detecting electrode CDE2 may be an electrode metal EM having two or more openings OA which is disposed between two adjacent second touch blocks X-TB2 and patterned as a mesh type similarly to the plurality of touch electrodes TE. Here, the second crack detecting electrode CDE2 is disposed on the same plane as the plurality of touch blocks TB so that an edge of the second crack detecting electrode CDE2 may have a zigzag pattern corresponding to the edge of the second touch block X-TB2.

The first touch connection electrode X-CL intersecting the second crack detecting electrode CDE2 is disposed so as to overlap the electrode metal EM of the second crack detecting electrode CDE2. For example, the first touch connection electrode X-CL is not disposed on the same plane as the second crack detecting electrode CDE2 or the plurality of touch electrodes TE so that it overlaps the second crack detecting electrode CDE2.

Generally, when the crack detecting electrode intersecting the touch electrode is formed to have a pattern having a linear shaped edge, there is a problem in that the cracking detecting line is visible from the outside, unlike the adjacent touch electrode having a mesh pattern.

In the display device according to the exemplary embodiment of the present disclosure, the shapes of the touch electrode and the second crack detecting electrode CDE2 are unified, so that the external visibility of the second crack detecting electrode CDE2 may be minimized. Specifically, the second crack detecting electrode CDE2 is formed by cutting along the zigzag shape of the edge of the mesh pattern formed by the plurality of touch electrodes TE so that the edge of the second crack detecting electrode CDE2 has a zigzag shape, to minimize the external visibility of the second crack detecting electrode CDE2.

Figure 10:
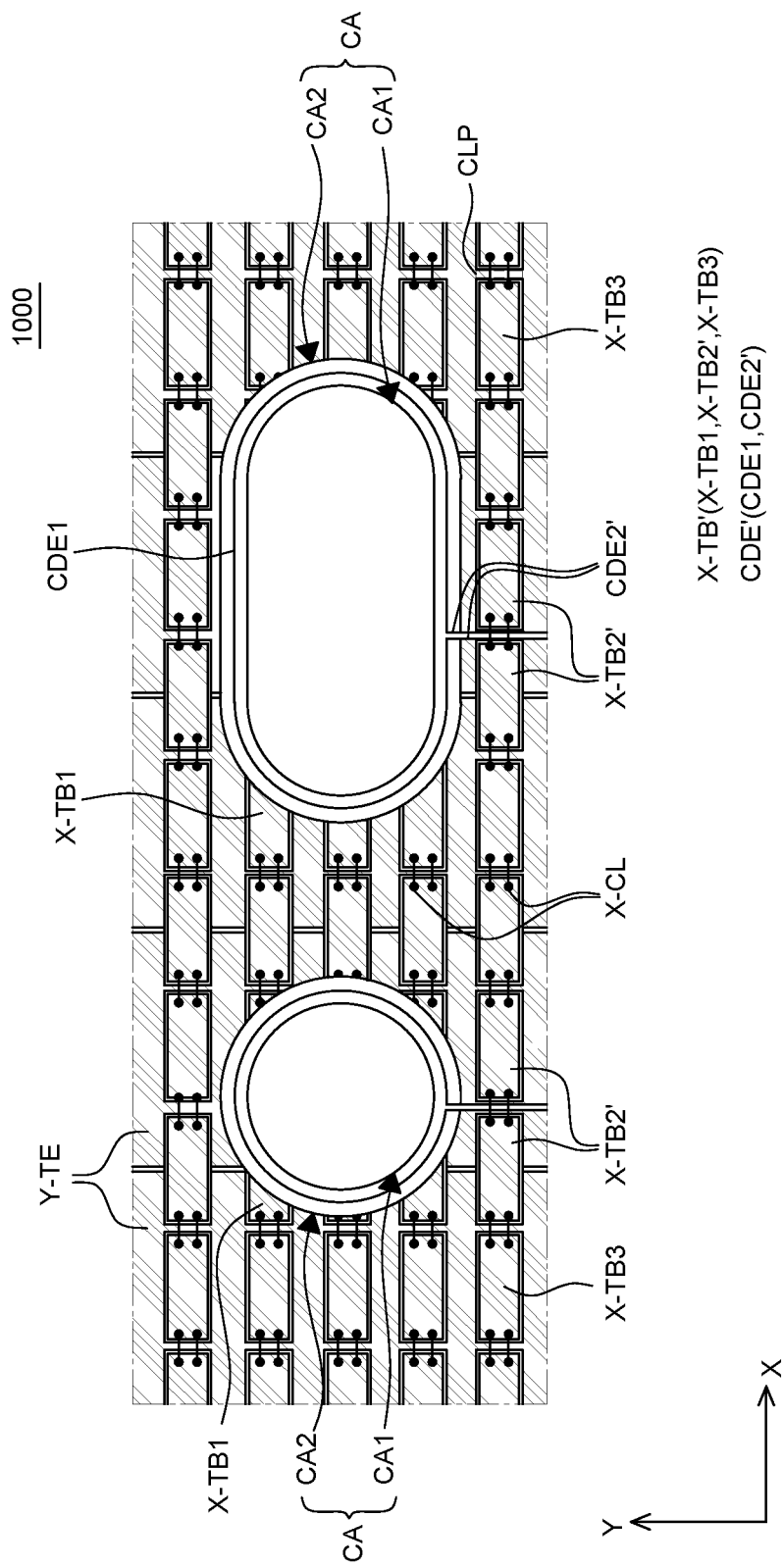
FIG. 10 is an enlarged view of a display device according to another exemplary embodiment of the present disclosure.

FIG. 10 is an enlarged view of a display device according to another exemplary embodiment of the present disclosure. FIG. 10 is a view schematically illustrating a touch electrode TE. A display device 1000 of FIG. 10 has substantially the same configurations as the display device 100 of FIGS. 1 to 9 except for a size of a second touch block X-TBE2' and an arrangement position of a second crack detecting electrode CDE2', so that a redundant description will be omitted.

Referring to FIG. 10, the second touch block X-TB2' has the same size as the third touch block X-TB3. The second crack detecting electrode CDE2' is disposed on the same plane as the second touch block X-TB2' to be disposed between two adjacent second touch blocks X-TB2' and intersect the first touch connection electrode X-CL. The second crack detecting electrode CDE2' is not electrically connected to any of the touch block TB or the touch connection electrode CL. In other words, the second crack detecting electrode CDE2' does not intersect between at least one third touch block X-TB3, but may be disposed in a connection unit which is an area between adjacent third touch blocks X-TB3. For example, the second crack detecting electrode CDE2' may be disposed so as to overlap an area in which the first touch connection electrode X-CL electrically connecting the adjacent third touch blocks X-TB3 is disposed.

Accordingly, in the display device 1000 according to another exemplary embodiment of the present disclosure, the shapes of the touch electrode TE and the second crack detecting electrode CDE2' are unified, so that the external visibility of the second crack detecting electrode CDE2' may be minimized. Further, the first touch connection electrode X-CL is regularly disposed so that the possibility of the first touch connection electrode X-CL which is visible from the outside may be minimized.

The exemplary embodiments of the present disclosure can also be described as follows:

According to an aspect of the present disclosure, a display device includes a substrate including a camera area in which a camera is disposed, a display area which surrounds the camera area and includes a plurality of sub pixels, and a non-display area located at the outer periphery of the display area; a plurality of touch electrode disposed in the display area; a touch connection electrode which connects two adjacent touch electrodes which are spaced apart from each other, among the plurality of touch electrodes; and a crack detecting electrode which surrounds the camera area and is disposed on the same layer as the plurality of touch electrodes, the plurality of touch electrodes include a plurality of first touch electrodes extending in a first direction and a plurality of second touch electrodes extending in a second direction intersecting the first direction, wherein the crack detecting electrode includes a first crack detecting electrode which surrounds the camera area and a second crack detecting electrode which is disposed in the display area and extends in the second direction, and the second crack detecting electrode has a zigzag pattern.

The first touch electrode may include a plurality of touch blocks and the plurality of touch blocks have a first touch block adjacent to the camera area, a second touch block adjacent to the second crack detecting electrode, and a third touch block excluding the first touch block and the second touch block.

The second touch block may have the same size as the third touch block.

The second touch block may have a different size different from the third touch block.

The second crack detecting electrode may be disposed in a connection unit disposed between two adjacent touch blocks among the plurality of touch blocks.

The plurality of touch electrodes may have a mesh pattern.

According to another aspect of the present disclosure, a display device includes a substrate including a camera area in which a camera is disposed, a display area which surrounds the camera area and includes a plurality of sub pixels, and a non-display area located at the outer periphery of the display area; an encapsulation unit which covers the display area; a plurality of first touch electrodes and a plurality of second touch electrodes disposed on the encapsulation unit to intersect in different directions; a touch connection electrode which connects two adjacent first touch electrodes among the plurality of first touch electrodes; and a crack detecting electrode which surrounds the camera area and is disposed on the same layer as the plurality of first touch electrodes and the plurality of second touch electrode, the crack detecting electrode includes a first crack detecting electrode which surrounds the camera area and a second crack detecting electrode which is disposed in the display area and extends in the second direction, and the second crack detecting electrode has a zigzag pattern.

The first touch electrode may include a plurality of touch blocks and the plurality of touch blocks have a first touch block adjacent to the camera area, a second touch block adjacent to the second crack detecting electrode, and a third touch block excluding the first touch block and the second touch block.

The second touch block may have the same size as the third touch block.

The second touch block may have a different size different from the third touch block.

The second crack detecting electrode may have a mesh pattern and intersects the touch connection electrode.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:
   a substrate including a camera area in which a camera is disposed, a display area which surrounds the camera area and includes a plurality of sub pixels, and a non-display area located at an outer periphery of the display area;
   a plurality of touch electrode disposed in the display area;
   a touch connection electrode which connects two adjacent touch electrodes which are spaced apart from each other, among the plurality of touch electrodes; and
   a crack detecting electrode which surrounds the camera area and is disposed on the same layer as the plurality of touch electrodes,
   wherein the plurality of touch electrodes include a plurality of first touch electrodes extending in a first direction and a plurality of second touch electrodes extending in a second direction intersecting the first direction, and
   wherein the crack detecting electrode includes a first crack detecting electrode which surrounds the camera area and a second crack detecting electrode which is disposed in the display area and extends in the second direction, and
   wherein the second crack detecting electrode has a zigzag pattern.

2. The display device according to claim 1,
   wherein the first touch electrode includes a plurality of touch blocks; and
   wherein the plurality of touch blocks have a first touch block adjacent to the camera area, a second touch block adjacent to the second crack detecting electrode, and a third touch block excluding the first touch block and the second touch block.

3. The display device according to claim 2,
   wherein the second touch block has the same size as the third touch block.

4. The display device according to claim 2,
   wherein the second touch block has a different size different from the third touch block.

5. The display device according to claim 2,
   wherein the second crack detecting electrode is disposed in a connection unit disposed between two adjacent touch blocks among the plurality of touch blocks.

6. The display device according to claim 1,
   wherein the plurality of touch electrodes have a mesh pattern.

7. A display device, comprising:
   a substrate including a camera area in which a camera is disposed, a display area which surrounds the camera area and includes a plurality of sub pixels, and a non-display area located at an outer periphery of the display area;
   an encapsulation unit which covers the display area;
   a plurality of first touch electrodes and a plurality of second touch electrodes disposed on the encapsulation unit to intersect in different directions;
   a touch connection electrode which connects two adjacent first touch electrodes among the plurality of first touch electrodes; and
   a crack detecting electrode which surrounds the camera area and is disposed on the same layer as the plurality of first touch electrodes and the plurality of second touch electrode,
   wherein the crack detecting electrode includes a first crack detecting electrode which surrounds the camera area and a second crack detecting electrode which is disposed in the display area and extends in the second direction, and
   wherein the second crack detecting electrode has a zigzag pattern.

8. The display device according to claim 7,
   wherein the first touch electrode includes a plurality of touch blocks, and
   wherein the plurality of touch blocks have a first touch block adjacent to the camera area, a second touch block adjacent to the second crack detecting electrode, and a third touch block excluding the first touch block and the second touch block.

9. The display device according to claim 7,
   wherein the second touch block has the same size as the third touch block.

10. The display device according to claim 7,
    wherein the second touch block has a different size different from the third touch block.

11. The display device according to claim 7,
    wherein the second crack detecting electrode has a mesh pattern and intersects the touch connection electrode.

* * * * *